Patented May 20, 1930

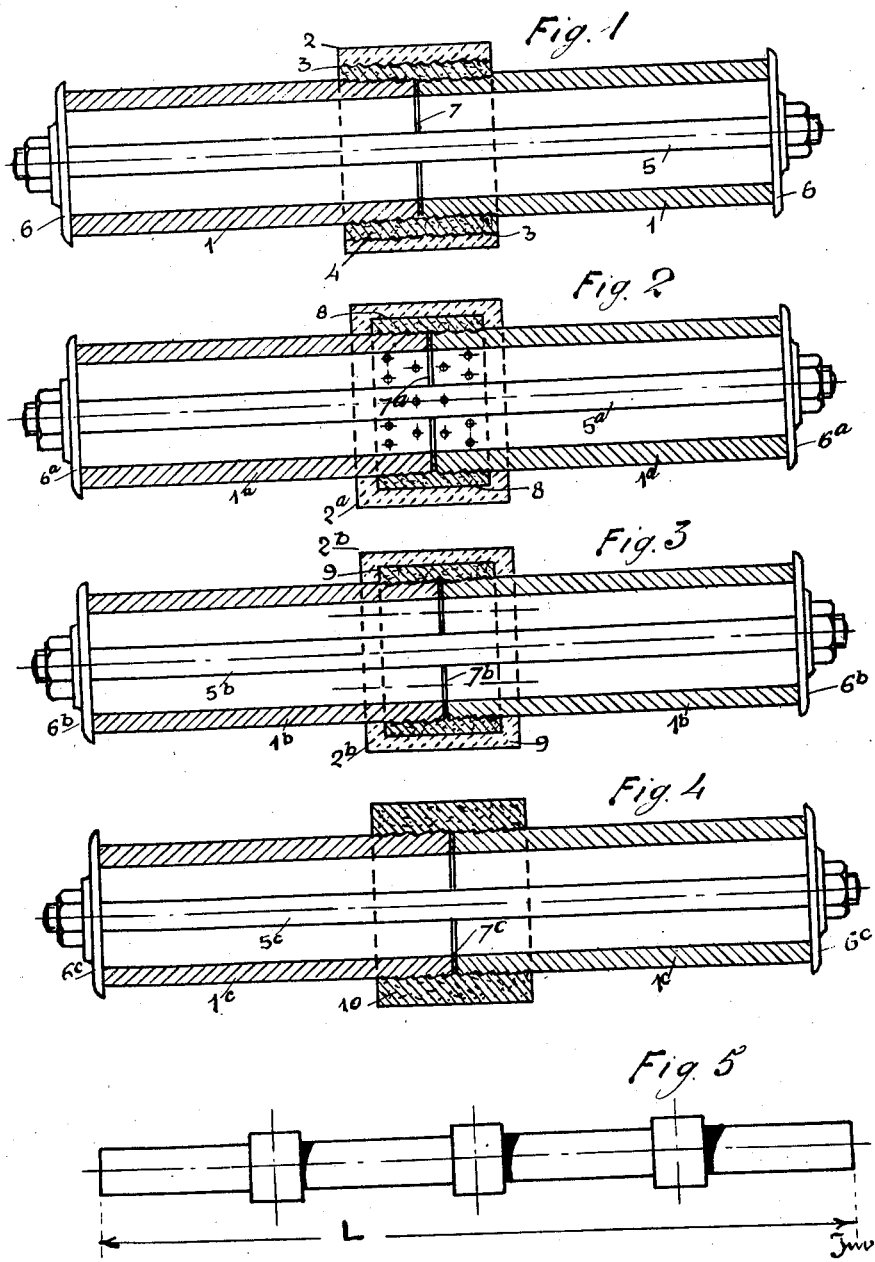

1,759,780

UNITED STATES PATENT OFFICE

FRANCESCO FIGARI, OF GENOA, ITALY

RIGID JOINT, PIPE, AND ITS MANUFACTURE

Application filed November 6, 1925, Serial No. 67,458, and in Italy November 10, 1924.

This invention relates to rigid joints for pipes and particularly to the employment of said joints in the construction of long pipes from a series of short pipe sections.

It is known that the tightening of cross joints is obtained by strongly pressing the butt ends of pipes conveniently planed or cross surfaces planed in the joint with or without packing interposed. This pressure is generally obtained by bolts applied to the joint and forming part of it. The joint must be therefore strong enough to withstand the pressure thus becoming costly and complicated.

The present invention therefore has for its principal object the provision of an improved joint and method of effecting the same at a considerably reduced price.

The pressure necessary to make the joint tight is no longer given by means which are part of the joint, but, by outward means. And this pressure once given is fixed, namely the two pipes are obliged to remain in the same respective positions and therefore to maintain the aforesaid pressure by binding means cast or poured around the butt ends of the pipes which have been previously roughened or grooved in order to give to the binding material a firm grip on the same. It is easily understood that in these conditions when the binding material has set hard the outward or auxiliary pressure device may be removed without endangering the tightness of the joint.

The most important feature of the device is that of forming long pipes with a certain number of short sections of simple but effective construction and which would not be separately employed for mains because of the large number of costly ordinary joints required to adapt them for such purpose.

In the annexed drawings are shown, some practical solutions of the problem and particularly Figs. 1 to 4 show in axial section some types of joints and a type of mechanical device, applied in the setting up of two successive sections of a pipe. Fig. 5 shows in an external lateral view, a pipe according to the present invention obtained through the connection of four sections of a pipe.

Referring now, more particularly to Fig. 1, the numeral 1 designates two sections of a pipe to be connected the outer surfaces of which adjacent the meeting edges may be made rough by transverse grooves, cuts, etc., if said surface does not already possess such owing to its manufacture, and 2 represents a rigid sleeve either metallic, or of reinforced cement or of any other resistant material. The inside diameter of the sleeve is slightly larger than the external diameter of the pipes whilst the interior surface of the sleeve is also rough or provided with projections 3; 4 is a cast substance or a substance of cement, placed in the annular space between the sleeve and the pipe; 5 is a tension rod provided at the ends with nuts which by means of two plates 6 serves to press the packing 7 interplaced between the two adjacent or meeting edges of the pipe sections 1.

This packing may also be eliminated if the two heads are suitably predisposed; for instance if they were highly and smoothly polished.

The joint is formed by tightening the tension rod 5, so that the packing 7 is pressed between the two sections 1 to be connected. The sleeve 2 is now placed about the meeting or adjacent edges of the sections and a cementitious substance is poured into the annular space between the sleeve and the pipes.

When the cementitious substance has become solid, or when the mixture of cement has adhered, the device which has initially produced the pressure is withdrawn and the two portions of the pipe, that is, the two pipe sections will remain fixed under the originally applied pressure due to the adherence of the substance 4 upon the rough walls of the sleeve.

Figs. 2 and 3 show joints whose rigid sleeve has also the object of reinforcing the binding. $1^a$ represents the two pipe sections $5^a$ and $6^a$. The pressure applying means which is connected with the remote ends of the pipe sections, serves to press the packing $7^a$ or the two meeting heads of the sections directly together. The sleeve $2^a$ is of reinforced cement which is poured around the meeting edges. If desired, the roughened portion of the pipe sections may be provided with perforations 8 (Fig. 2) while the outer edges of the sleeve may be provided with flanges 9 (Fig. 3) to reinforce the binding.

Fig. 4 shows a metallic sleeve (10) which is cast directly round the juncture of the pipe sections. The reference characters designate corresponding parts as those of the preceding figures with the exception of being primed. The same may be said of the reference numerals in Figures 2 and 3.

In Fig. 5 there is shown a long pipe made up from a plurality of pipe sections. These sections or elements are connected in the same manner as in the preferred form.

This type of rigid joint presents a distinctive advantage from an economical view point in that it is not subject to any radial internal pressure so that it only has to stand the accidental external pressures.

Though for descriptive reasons the preceding description has been based on what has been described and illustrated, yet many practical modifications may be made to accomplish the solution of the problem, as for the structure of the joint device, as regards the device designed to produce, during the complete application of the joint, the axial pressure designed to guarantee the tightening of the successive joints.

Having now fully described and ascertained my said invention and the manner in which it is to be performed, I declare that what I claim is:

A method for jointing pipe sections consisting in arranging a plurality of sections together in series, roughening the outer surface of the end portions of adjacent pipe sections, exerting temporary pressure on the remote ends of said sections to temporarily hold the sections together under pressure, applying a cementitious binding circumferentially about the roughened portions and across the meeting edges of the pipe sections to permanently connect the sections together under pressure, and finally removing the temporary pressure subsequent to the hardening of the binding.

FRANCESCO FIGARI.